United States Patent
Cranshaw

[11] Patent Number: 6,117,319
[45] Date of Patent: Sep. 12, 2000

[54] FLUID DISPENSING SYSTEMS

[76] Inventor: Christopher James Cranshaw, 23A Rotomahana Crescent, Remuera, Auckland 1005, New Zealand

[21] Appl. No.: 08/973,125

[22] PCT Filed: May 30, 1996

[86] PCT No.: PCT/NZ96/00052

§ 371 Date: Dec. 31, 1997

§ 102(e) Date: Dec. 31, 1997

[87] PCT Pub. No.: WO96/38382

PCT Pub. Date: Dec. 5, 1996

[30] Foreign Application Priority Data

May 31, 1995 [NZ] New Zealand ............................ 272264

[51] Int. Cl.[7] ................... C02F 1/28; C02F 9/00; B01D 27/04; B01D 27/08
[52] U.S. Cl. .................. 210/232; 210/238; 210/282; 210/464; 210/669; 222/189.1; 222/189.07; 222/189.09; 55/502; 55/503; 55/505
[58] Field of Search ..................... 210/238, 266, 210/282, 464, 669, 232, 416.3; 222/189.07, 189.09, 189.1; 55/502, 503, 505, 467

[56] References Cited

U.S. PATENT DOCUMENTS

| | | |
|---|---|---|
| 2,389,185 | 11/1945 | Dick . |
| 2,711,994 | 6/1955 | Quinn . |
| 2,761,833 | 9/1956 | Ward . |
| 3,149,758 | 9/1964 | Bush . |
| 3,189,223 | 6/1965 | Mackal . |
| 3,248,017 | 4/1966 | Allen . |
| 3,346,146 | 10/1967 | Thompson . |
| 4,443,336 | 4/1984 | Bennethum . |
| 4,477,347 | 10/1984 | Sylva . |
| 4,491,520 | 1/1985 | Jaye . |
| 4,605,499 | 8/1986 | Wise . |
| 4,767,544 | 8/1988 | Hamblin . |
| 4,816,149 | 3/1989 | Wekell . |
| 4,917,271 | 4/1990 | Kanner . |
| 4,938,389 | 7/1990 | Rossi . |
| 5,045,195 | 9/1991 | Spangrud et al. . |
| 5,080,800 | 1/1992 | Heyl . |
| 5,122,272 | 6/1992 | Iana et al. . |
| 5,211,973 | 5/1993 | Nohren, Jr. . |
| 5,219,101 | 6/1993 | Matkovich . |
| 5,238,153 | 8/1993 | Castillo . |
| 5,273,649 | 12/1993 | Magnusson et al. . |
| 5,407,573 | 4/1995 | Hughes . |
| 5,545,315 | 8/1996 | Lenneman . |
| 5,840,185 | 11/1998 | Hughes . |

FOREIGN PATENT DOCUMENTS

| | | |
|---|---|---|
| 0617951 | 10/1994 | European Pat. Off. . |
| 28 38 205 | 3/1980 | Germany . |

Primary Examiner—Thomas M. Lithgow
Attorney, Agent, or Firm—Brown, Martin, Haller & McClain, LLP

[57] ABSTRACT

This invention relates to fluid dispensing apparatus. The fluid dispensing apparatus comprises a fluid storage portion comprised primarily of a substantially flexible material, a fluid exit portion, and a filter cartridge disposed between the fluid storage portion and the fluid exit portion. The arrangement and construction is such that the action of squeezing and/or inverting the fluid storage portion forces fluid stored withing the fluid storage portion to pass through the filter cartridge and towards or out through the fluid exit portion.

19 Claims, 5 Drawing Sheets

FLUID DISPENSING SYSTEMS

TECHNICAL FIELD

This invention relates to improvements in and relating to fluid dispensing systems, and particularly with respect to fluid dispensing systems that involve filtration of the fluid before the fluid is dispensed. It is envisaged that the invention may be particularly suitable as a water bottle which allows for filtration of water within the water bottle before it is dispensed therefrom. However, it is to be understood and appreciated that the invention is not to be limited to such use.

BACKGROUND ART

Currently there appears to exist a need for a convenient and user-friendly fluid dispensing apparatus which is capable of storing fluid in a fluid storage area, and then providing a means for the fluid to be filtered before it is dispensed from the apparatus.

Such an apparatus may be particularly useful for people such as trampers, dwellers in crowded and/or unhygienic cities, or others, who require fluid such as water to be filtered (primarily for health reasons) prior to drinking the fluid (or using the fluid for other purposes, eg cooking).

Furthermore, such an apparatus may also be useful for people who have access to treated water supplies, but who wish to remove the sometimes mildly unpleasant taste associated with chlorine and other chemicals which are used to treat or purify such water supplies. Moreover, such an apparatus may be suitable for use by joggers or cyclists who wish to take a water bottle with them during their exertions.

Currently there exists a number of water bottles of various types which are used to store water before allowing the water to be dispensed from the bottle. For example, simple drinks containers or bottles are frequently used by cyclists and joggers. These containers usually consist of a simple container having an enclosure in which water may be stored, and a means (such as a cap or aperture) by which the water may be dispensed from the bottle. However, these bottles typically have no means by which the water may be filtered before being dispensed from the bottle.

There are available water purification tablets (comprised primarily of iodine) which may be used by people such as trampers to sterilise water. However, a disadvantage associated with the use of water purification tablets is that they leave the water with an unpleasant taste or tang.

To partially meet some of the problems described above, a water purification system is described in U.S. Pat. No. 4,443,336. This patent describes a fluid container in the form of a bag, which includes two enclosures in which fluid may be stored. The first enclosure is intended as a storage area for water (with impurities) which at some time later may wish to be drunk. Between the first fluid storage area and the second fluid storage area is located a filter which allows for some impurities from the water to be removed as the water is transferred (typically by squeezing the bag) from the first storage area to the second. There is additionally provided a further filter located between the second fluid storage area and the exit portion of the container, by which further impurities may be removed from the fluid before it is dispensed from the container.

Although this provides a system for filtering fluid before it is drunk or used by the user of the fluid storage apparatus, this apparatus suffers from a number of disadvantages. One disadvantage is that by the provision of two fluid storage areas, the fluid carrying capacity of the container is substantially halved, and hence water that has already been filtered must be carried together with unfiltered water. In addition, the two-step procedure of squeezing the first fluid storage area so that the water flows to the second fluid storage area, and then subsequently squeezing the second storage area so that fluid may flow to the fluid exit portion of this container is an unduly complex operation and somewhat fiddly and time consuming. This could cause frustration, leading to users of the apparatus not bothering to filter the fluid properly before drinking the fluid. A further disadvantage is that the bag(s) comprising the apparatus is flopped and/or jelly-like, and may therefore be difficult to carry, use, fill and/or store.

U.S. Pat. No. 4,767,544 describes an orally operable water filter, in the form of a straw-like device. This invention does not include a fluid storage area, and/or is not operable by squeezing. Moreover, a disadvantage associated with this invention is that the apparatus, being very narrow, would become clogged with impurities relatively quickly and easily.

U.S. Pat. Nos. 2,711,994 and 4,816,149 describe water filtration apparatus which are gravity fed. The main disadvantage associated with both of these inventions is that the filtration is gravity fed which can be slow. Furthermore, neither of these patents describes water filtration apparatus which are portable and/or self-contained.

It is an object of the present invention to address the foregoing problems or difficulties, or at least to provide the public with a useful choice.

Further aspects and advantages of the present invention will become apparent from the ensuing description which is given by way of example only.

DISCLOSURE OF INVENTION

According to one aspect of the present invention there is provided fluid dispensing apparatus comprising:
(a) a fluid storage portion comprised primarily of a substantially flexible material,
(b) a fluid exit portion,
(c) a filtering means disposed between said fluid storage portion and said fluid exit portion,
  the arrangement and construction being such that the action of squeezing and/or inverting the fluid storage portion forces fluid stored within the fluid storage portion to pass through the filtering means and towards or out through the fluid exit portion.

According to another aspect of the present invention there is provided fluid dispensing apparatus substantially as described above wherein said fluid storage portion is detachable from said filtering means.

According to another aspect of the present invention there is provided fluid dispensing apparatus substantially as described above wherein said fluid storage portion is comprised of a substantially rigid, yet flexible, material whereby the fluid storage portion and/or said fluid dispensing apparatus is able to be free standing.

According to another aspect of the present invention there is provided fluid dispensing apparatus substantially as described above wherein said filtering means is housed within a filter housing.

According to another aspect of the present invention there is provided fluid dispensing apparatus substantially as described above wherein said filter housing includes filter retention means for releasably retaining said filtering means within said housing.

According to another aspect of the present invention there is provided fluid dispensing apparatus substantially as described above wherein said filter housing and/or said filtering means further includes sealing means whereby fluid from said fluid storage portion is prevented from reaching said fluid exit portion other than by passing through said filtering means.

According to another aspect of the present invention there is provided fluid dispensing apparatus substantially as described above wherein said filtering means comprises or includes a cartridge of granular activated carbon.

According to another aspect of the present invention there is provided fluid dispensing apparatus substantially as described above wherein said filtering means comprises a pre-filter portion and a main filter portion.

According to another aspect of the present invention there is provided fluid dispensing apparatus substantially as described above wherein said pre-filter portion is in the form of a filter paper, and said main filter portion is in the form of a cartridge of granular activated carbon.

According to another aspect of the present invention there is provided fluid dispensing apparatus substantially as described above wherein said filter housing comprises an upper portion and a lower portion, said upper portion housing or retaining the main filter portion and said lower portion housing or retaining said pre-filter portion.

According to another aspect of the present invention there is provided fluid dispensing apparatus substantially as described above wherein said upper portion is provided with engagement means to assist in the screwing and/or unscrewing of the upper portion with respect to said lower portion.

According to another aspect of the present invention there is provided fluid dispensing apparatus substantially as described above wherein said fluid storage portion is provided with engagement means complimentary to said engagement means disposed on/in said upper portion, the arrangement and construction being such that once the lower portion has been unscrewed from the fluid storage portion, the engagement means of the upper portion may be engaged with the complimentary engagement means disposed on/in the fluid storage portion to assist in the screwing or unscrewing of said upper portion with respect to said lower portion.

According to another aspect of the present invention there is provided fluid dispensing apparatus substantially as described above wherein said filtering means extends into said fluid storage portion.

It is envisaged that the invention may be particularly suitable for storing and filtering/purifying water, prior to it being dispensed. However it is to be understood and appreciated that the invention may also be utilised, or be suitable, for filtering/purifying any other fluid, and including gases.

Furthermore, the term "filtering" (or "filtered") is to be understood or construed as meaning "filtering and/or purifying". For convenience however, only the word "filtering" shall be used.

The fluid storage portion may be of any suitable size, shape or configuration as required or desired, or as dictated by the type of fluid to be stored therein and/or filtered by the fluid dispensing apparatus. The fluid storage portion may preferably comprise a substantial portion of the overall volume or area of the apparatus, although this may again depend upon the type of fluid to be filtered. For example, if a particularly dirty or contaminated fluid was to be filtered by the apparatus, it may be desirable to have the fluid storage portion smaller in relation to the filtering means as compared to filtering a relatively clean fluid, in which the opposite may apply.

Preferably, the fluid storage portion may have a capacity of between 500 mls to 3 liters.

The fluid storage portion may preferably be detachable from the filtering means. In this way, the fluid storage portion may be filled with an appropriate fluid by detaching it from the filtering means, prior to filling same and re-attaching it to the filtering means. Any suitable means may be utilised for rendering the fluid storage portion detachable with respect to the filtering means. A screw fit may be particularly suitable.

Alternatively, in other embodiments of the present invention the fluid storage area may not in fact be detachable from the water bottle, but may be fillable in other ways (for example, by the provision of an entry area or resealable cap or opening into the fluid storage area which may allow fluid to be poured directly into the fluid storage area).

The fluid storage portion may preferably comprise or consist primarily of (or include) a substantially flexible material. The term "flexible" is intended to denote any substance which is capable of deforming once a moderate force (such as squeezing) is applied to it. Suitable "flexible" materials for use in the present invention may include a number of plastic materials, such as those which are used for presently available water bottles for cyclists, or other similar water bottles or containers, for example polypropylene or polyethylene. Alternatively, or additionally, a rubber material may be suitable.

The flexible material comprising the fluid storage portion may preferably be substantially rigid, yet still flexible, whereby the fluid storage portion and/or the fluid dispensing apparatus is able to be free standing. That is, the fluid storage portion and/or fluid dispensing apparatus may preferably resemble presently available water bottles, or like devices, yet be sufficiently flexible whereby the fluid storage portion is able to be squeezed sufficiently whereby fluid stored therein may be forced through the filtering means. It is envisaged that inverting the fluid storage portion, whilst squeezing same, may assist in forcing the fluid through the filtering means, particularly if the fluid level is low.

As discussed, by squeezing (or applying any other force) to the fluid storage area, fluid will be forced from the fluid storage area through the filtering means. As this occurs, impurities or undesirables such as bacteria are removed from the fluid by the filtering means, which increases the purity of the fluid originally contained in the fluid storage area.

Once the fluid has passed through the filtering means, the fluid may then pass to and/or out of the fluid exit portion, which allows the fluid to be drunk, or used for any other purpose. As this fluid has been filtered, it is envisaged to be considerably safer or more desirable to use than any fluid which has not been filtered in a similar way.

The fluid exit portion may be of any design or configuration which enables fluid to exit from the fluid dispensing apparatus when or as required or desired.

The fluid exit portion may preferably comprise or consist of a resealable cap. Preferably this cap may be adjustable so that it may provide a fluid type seal for the apparatus in one configuration, and in a second configuration may provide a means by which fluid may exit the apparatus. Many such caps are already well known in prior art water bottles, and will not be discussed further here.

Any suitable filtering means may be utilised as required or as desired or as dictated by the type of fluid to be filtered.

The filtering means may preferably be housed within a suitable filter housing. Any suitable filter housing may be utilised as required or as desired, or as dictated by the type of fluid to be filtered or the type or make up of the filtering means. Preferably, the filter housing may be detachable from the fluid storage portion. Any suitable releasable detachment means may be utilised, although a screw fit may be particularly suitable.

Advantages of having the filter housing detachable with respect to the fluid storage portion is that the filtering means housed within the filter housing may be readily accessed, for example for inspection or for cleaning or replacement purposes. Furthermore, fluid may readily be placed into the fluid storage portion once it has been detached from the filtering means or filter housing.

The filter housing may preferably be provided with, or include, filter retention means for releasably retaining the filtering means within the filter housing. Preferably, the filter retention means may provide for or allow the filtering means to be firmly retained therein or thereby. Any suitable filter retention means may be utilised as required or as desired, or as dictated by the type or design of the filtering means and/or the type of fluid to be filtered. For example, the filter housing may be provided with a groove or lip adapted to be complimentary to the filtering means, whereby the filtering means may be releasably retained by the groove or lip. Alternatively, or additionally, the filtering means may be releasably retained within the filter housing by the use of push-in clips or other releasable retention means.

The filter housing, and/or filtering means, may further include sealing means whereby fluid from the fluid storage portion is prevented from reaching the fluid exit portion other than by passing through the filtering means. Any suitable sealing means may be utilised as required or as desired, or as dictated by the makeup or design of the filtering means and/or the type of fluid to be filtered. For example, the sealing means may be in the form of a rubber O ring situated between the filter housing and the filtering means. Alternatively, or additionally, the sealing means may include a moulding adapted to encompass the filtering means, with the moulding being adapted to form a fluid-type seal between it and the filter housing. Rubber washers may also be utilised.

The filtering means may preferably be in the form of a cartridge of granular activated carbon. Such cartridges (or briquettes as they are sometimes called) are presently available and need not be described in detail herein. The cartridge may be appropriately configured to fit snugly within the filter housing and/or to provide a fluid-type seal between the cartridge and the filter housing and/or between the cartridge and the fluid storage portion. In this regard, the granular activated carbon may preferably be encased within a moulding (preferably a soft plastic moulding) as described above. Such a moulding may preferably be comprised of a low density polyethylene.

In one embodiment of the present invention, the filtering means may comprise a plurality of filters or filtering stages. For example, the filtering means may comprise a pre-filter portion and a main filter portion. In such an embodiment the pre-filter portion may preferably be in the form of a filter paper and the main filter portion may preferably be in the form of a cartridge of granular activated carbon.

An advantage of having such a pre-filter portion is that if the fluid to be filtered is particularly dirty, the pre-filter portion, such as a filter paper, will become dirty or clogged up, instead of the main filter portion such as a cartridge of granular activated carbon.

Hence, the pre-filter portion such as a filter paper may therefore be readily discarded when required or as desired, and hence the life of the main filter portion is extended.

It is also envisaged that any other filtering means may be additionally or alternatively utilised. For example, the filtering means may include an ion exchange resin and an iodine resin, both of which have specific and known filtration applications. Such additional filtering means may be provided separately as a further filtering stages or alternatively may be incorporated within the cartridge of granular activated carbon or other filtering means.

In one embodiment of the present invention the filter housing may comprise or include an upper portion and a lower portion, the upper portion housing or retaining the main filter portion, and the lower portion housing or retaining the pre-filter portion. Preferably the upper portion may be a screw fit with respect to the lower portion and the lower portion may be a screw fit with respect to the fluid storage portion.

In such an embodiment, the filter housing may be removed from the fluid storage portion by unscrewing the lower portion from the fluid storage portion. The pre-filter portion such as a filter paper may therefore be readily inspected, removed and replaced if necessary. To access the main filter portion, the upper portion of the filter housing may then be unscrewed from the lower portion, and the main filter portion thereby accessed where it may be inspected and/or replaced if necessary.

Given that there must preferably be a fluid type seal within the filtering means or filter housing, the upper portion of the filter housing may preferably be a substantially snug fit with respect to the lower portion, and hence, the upper portion should preferably be screwed tightly into the lower portion.

To assist in screwing and/or unscrewing the upper portion with respect to the lower portion, the upper portion may be provided with engagement means. Any suitable engagement means may be utilised, for example a lever or handle which may be engaged by the hand or a special tool.

Alternatively, and preferably, the fluid storage portion may be provided with engagement means complimentary to the engagement means disposed on or in the upper portion, the arrangement and construction being such that once the lower portion has been unscrewed from the fluid storage portion the engagement means of the upper portion may be brought into contact with and engaged with the complimentary engagement means disposed on or in the fluid storage portion to assist in the screwing or unscrewing of the upper portion with respect to the lower portion.

In one embodiment of the present invention, the filtering means may extend into the fluid storage portion to provide a greater surface area to enable filtering to occur, if required or if desired.

The fluid storage portion may preferably be provided with storage means. Such storage means may be utilised for storing items such as spare filter papers, money, keys, or additional filtering means such as iodine tablets and the like.

In one embodiment, the storage means may be in the form of a plurality of pockets in a band of material retained to the fluid storage portion by elastic means such as an elastic band or alternative fastening means such as VELCRO brand fastening systems.

Alternatively, and preferably, the storage means may be in the form of a recess formed within an end of the fluid storage portion and preferably the end which does not engage with the filtering means or filter housing. Such a storage means may preferably be provided with a resealable cover, and a screw on lid portion may be particularly suitable.

In use, the filter housing or filtering means may be detached from the fluid storage portion, and an appropriate fluid placed therein. The filter housing or filtering means may then be re-attached to the fluid storage portion. When or as required or desired, the fluid storage portion may then be squeezed and/or inverted whereby fluid contained therein may be forced through the filtering means and out through the fluid exit portion, to ultimately be drunk, or to be used for other purposes.

One advantage of the present invention is that once pressure is released from the fluid storage portion, air will be allowed or able to be sucked back into the fluid storage portion, through the fluid exit portion, through the filtering means, and ultimately back into the fluid storage area.

Hence, substantially the same amount of pressure will be required each time the fluid storage portion is squeezed regardless of how many times it has previously been squeezed, or how much volume of fluid is left remaining within the fluid storage portion.

Preferably, the fluid dispensing apparatus may be in the form of a portable bottle and the fluid dispensing apparatus may be particularly suitable for storing and filtering water.

Other advantages of the present invention include the fact that the fluid dispensing apparatus is portable, user friendly, relatively light in weight (if made predominantly from a plastics material), is free standing and allows for an appropriate fluid to be filtered and dispensed quickly and relatively easily. Moreover, by only having one main fluid storage portion, a user of the apparatus does not need to also carry around fluid that has already been filtered, but which is also being retained within the apparatus.

It is envisaged that the fluid dispensing apparatus may have many uses, however three possible uses of the apparatus are as follows:

1. Use by urban residents who dislike the taste of chlorine or other chemicals in town or city water supplies.
2. People such as trampers who have to utilise water from a stream or lake. The present invention may be used either with or without water purification tablets as required or as desired. That is, water purification tablets such as iodine tablets may be placed within the fluid storage, and the filtering means may not only filter the water but they also remove the unpleasant taste associated with the use of such tablets.
3. The apparatus may be used by people in countries that have untreated water supplies and/or where water supplies are contaminated with bacterial diseases or are otherwise considered unhealthy.

It is to be understood and appreciated that the above advantages or potential uses are given by way of example only, and the advantages or uses of the present invention is not in any way to be limited to those outlined above.

BRIEF DESCRIPTION OF DRAWINGS

Further aspects of the present invention will become apparent from the ensuing description which is given by way of example only and with reference to the accompanying drawings in which.

BEST MODES FOR CARRYING OUT THE INVENTION

Figure 1:
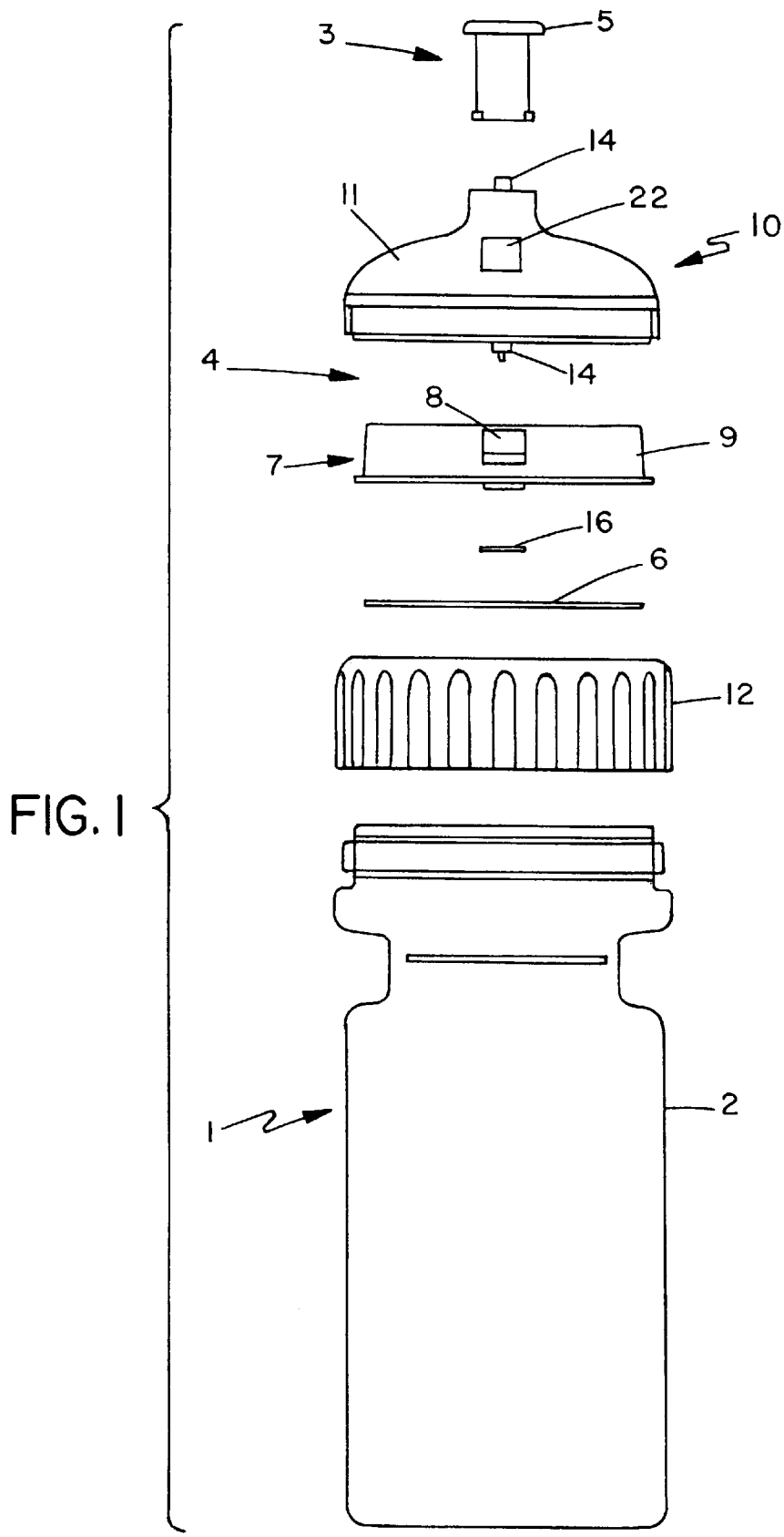
FIG. 1 is an exploded side view of one possible embodiment of the present invention.
Figure 2:
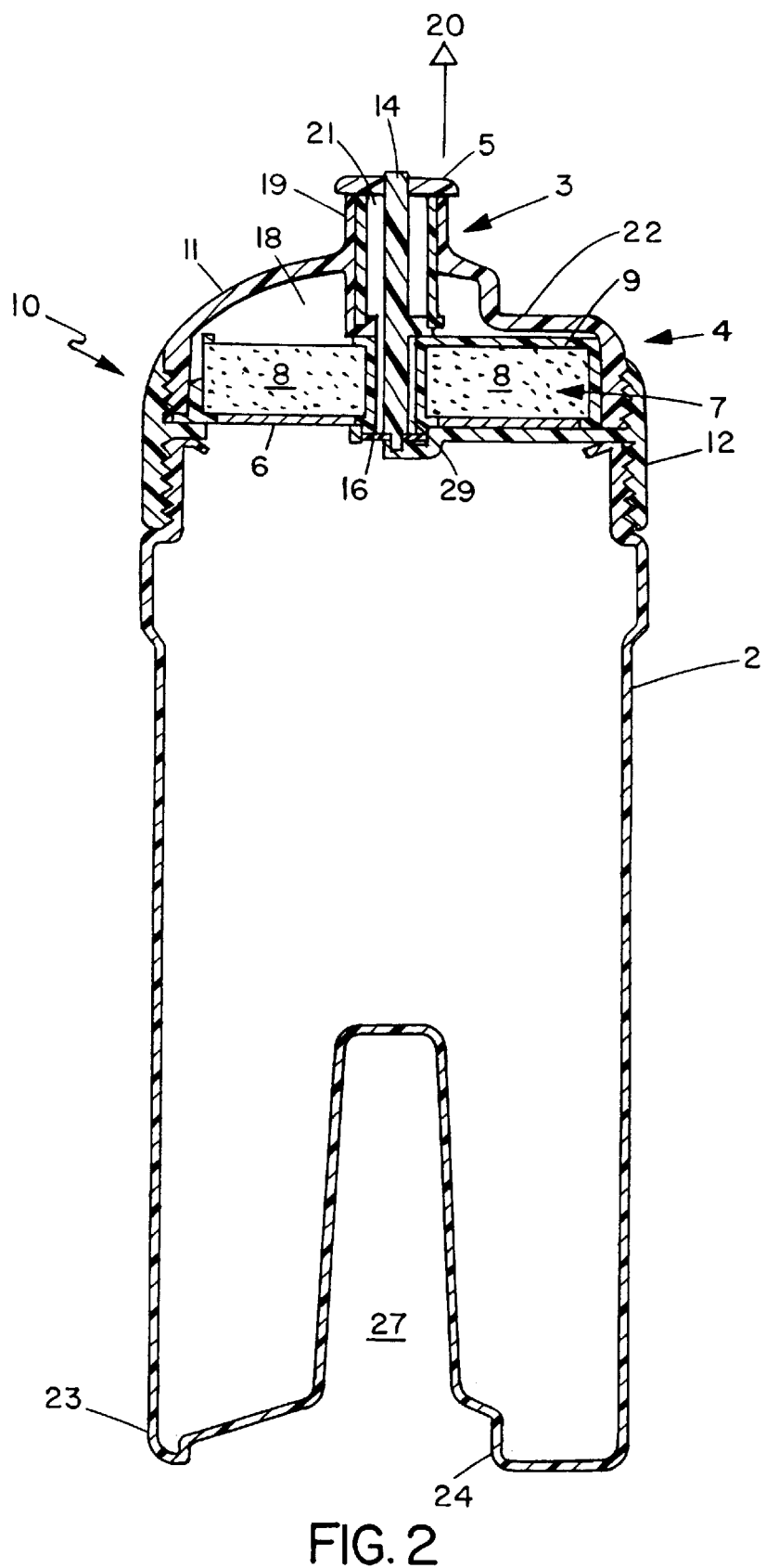
FIG. 2 is a cross-sectional side view of the embodiment shown in FIG. 1 (when not exploded)

Having regard to FIGS. 1 and 2, there is shown fluid dispensing apparatus generally indicated by arrow 1. The fluid dispensing apparatus 1 comprises a fluid storage portion 2, a fluid exit portion 3, and filtering means generally indicated by arrow 4 disposed between the fluid storage portion 2 and the fluid exit portion 3.

The fluid storage portion 2 has a capacity of approximately one liter, and is comprised of a substantially flexible plastic material, similar to the plastic material utilised in presently available drink bottles for cyclists and the like. It may be appreciated therefore that the filter storage portion 2 is comprised of a substantially rigid yet flexible, material whereby the fluid storage portion 2, and hence the fluid dispensing apparatus 1 is able to be free standing.

The fluid storage portion 2 is comprised of blow-moulded polypropylene.

The fluid exit portion 3 is in the form of an adjustable cap 5. The cap 5 is in the form of presently known prior art caps utilised in cyclists water bottles, and the like.

The filtering means 4 comprises a pre-filter portion in the form of a filter paper 6, and a main filter portion in the form of a cartridge 7 of granular activated carbon.

Water passing from the fluid storage portion 2, through the filtering means 4 first encounter the filter paper 6, and then encounters the cartridge 7. Hence, an advantage of utilising a pre-filter portion such as a filter paper 6, is that the filter paper 6 will remove the major or larger contaminants from the fluid prior to the fluid passing through the cartridge 7. This prevents the cartridge 7 from becoming unduly or quickly clogged up, and hence the cartridge 7 will not need to be replaced as quickly as if there was no pre-filter portion such as a filter paper 6 present in the apparatus 1. Given that cartridges 7 are significantly more expensive than filter paper 6, this is a significant advantage. Moreover, the filter paper 6 may be readily and easily removed from the apparatus 1 and replaced.

The cartridge 7 is made from granular activated carbon enclosed in a resin. The granular activated carbon and resin is in the form of a wafer or disc 8. The disc 8 is fully enclosed within a soft plastic moulding 9. The moulding 9 is comprised of low density polyethylene.

Granular activated carbon is particularly suitable as a filtering means since it can be produced in fine granules, and is effective in absorbing or removing many impurities.

Granular activated carbon has been proven to remove the following products or impurities:

alcohol
benzene
bleach
chlorine
chlorophenol
pesticides
plastic
rubber-hose taste
tannins
herbicides
insecticides
iodine general odours
defoliants
diesel fuel
dyes
gasoline Another reason why granular activated carbon is particularly suitable as a filtering means is that it has an enormous surface area. For example, a teaspoon of granular activated carbon has about the same surface area as a football field.

Because granular activated carbon works by absorption, it will not therefore generally remove dissolve solids. As a result, the cartridge 7 may be ineffective against treating salt water, calcium (hardness), and other dissolved salts such as nitrates and the like. Hence, an ion exchange resin may be incorporated within the disc of carbon 8, and/or otherwise incorporated into the cartridge 7. Alternatively, a separate ion exchange resin filter may be positioned either above or below the cartridge 7.

Furthermore, iodine pills, which will kill bacteria, viruses and cysts (for example giardia lambila), may be placed within the fluid storage portion 2, to kill the type of impurities. The use of granular activated carbon within the cartridge 7 will subsequently remove the unpleasant taste of the iodine pills.

In normal usage, and assuming that the fluid within the fluid storage portion 2 is not significantly dirty or contaminated, and also with the use of a pre-filter portion such as filter paper 6, it is envisaged that the cartridge 7 will need to be replaced approximately every three months.

The filtering means 4 is retained within a filter housing generally indicated by arrow 10. The filter housing 10 comprises an upper portion 11 and a lower portion 12. The lower portion 12 is a screw fit with respect to the fluid storage portion 2. Furthermore, the upper portion 11 is a screw fit with respect to the lower portion 12.

The upper portion 11 is provided with a recess or cavity 13 to house and retain the cartridge 7. The upper portion 11 is also provided with a central fixed rod-like portion 14. The cartridge 7 is provided with a central aperture (not clearly shown) which is adapted to fit over and around the rod-like portion 14 when being placed within the recess 13 in the upper portion 11.

The sides of the soft plastic moulding 9 provide a fluid tight seal between the inner wall of the upper portion 11 and the moulding 9.

The lower portion 12 is provided with a cross piece 15. The cross piece 15 serves to retain the filter paper 6 within the lower portion 12. The cross piece 15 also serves to retain or support the cartridge 7 within the lower portion 12, once the upper portion 11 has been screwed into the lower portion 12. The cross piece 15 does not of course unduly restrict or prevent fluid from passing from the fluid storage portion 2 through the lower portion 12, and subsequently through the filter paper 6 and cartridge 7. There is also provided a rubber sealing washer 16 which is adapted to fit over the end of the rod-like portion 14. When the upper portion 11 is screwed into the lower portion 12, the rubber washer 16 is firmly pressed into the central portion 17 of the cross piece 15. This serves to prevent any fluid passing from the fluid storage portion 2 up through the aperture 29 between the rod-like portion 14 and the aperture (not clearly shown) formed through the middle of the cartridge 7. Hence, any fluid passing from the fluid storage portion 2 may only exit through the cap 5 by virtue of passing through the filter paper 6 and cartridge 7.

In use, the cartridge 7 may be placed within the recess 13 in the upper portion 11 of the filter housing 10, and a filter paper 6 may be placed on the cross piece 15 of the lower portion 12 of the filter housing 10. The upper portion 11 may then be screwed firmly into the lower portion 12, and the fluid storage portion 2 may be filled with an appropriate fluid, for example contaminated water. The lower portion 12 may then be screwed onto the fluid storage portion 2.

When a user of the apparatus 1 wishes to dispense fluid from same the fluid storage portion 2 is squeezed (and may also be inverted—especially if the fluid level within the fluid storage portion is low) whereby fluid is forced out of the fluid storage portion 2 and through the filter paper 6 and cartridge 7.

With respect to FIG. 2 the fluid, once it has passed through the cartridge 7 briefly enters the chamber 18 within the upper portion 11. The cap 5 as illustrated in FIG. 2 is in the closed position whereby the side walls 19 of the cap 5 prevent fluid within the chamber 18 from exiting the apparatus 1. However, when the cap 5 is pulled up in the direction illustrated by arrow 20, it may be appreciated that the fluid within the chamber 18 may pass out through the cap 5 via the aperture 21. The cap 5 is in fact a standard cap found on many presently available drink bottles, such as those commonly used by cyclists or joggers.

The upper portion 11 is provided with engagement means in the form of three recessed portions 22 (only one shown—in FIGS. 1 and 2). The bottom 23 of the fluid storage portion 2 is provided with complimentary engagement portions 24 which are complimentary to and adapted to fit into the recessed portions 22 in the upper portion 11.

Figure 5:
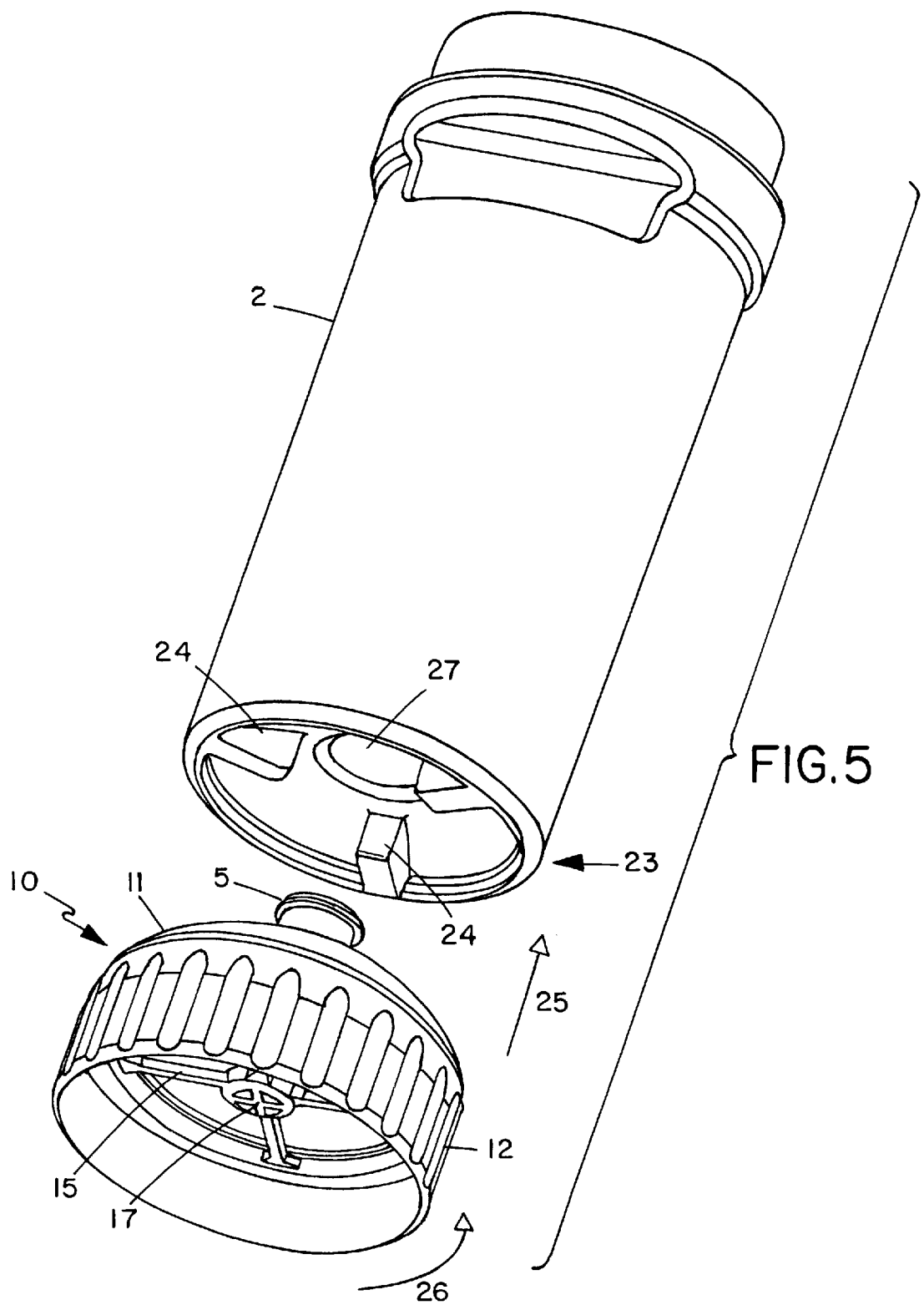
FIG. 5 is a side perspective view of the embodiment illustrated in FIGS. 1 to 4, illustrating the engagement means associated with the apparatus.

With reference to FIG. 5 it may be appreciated that once the lower portion 12 of the filter housing 10 has been unscrewed from the fluid storage portion 2, the upper portion 11 may be unscrewed from the lower portion 12 by fitting the engagement means 24 into the recessed portions 22 as indicated by arrow 25 and subsequently turning anti clockwise as indicated by arrow 26. Hence, the engagement means 22 and 24 assist in unscrewing the upper portion 11 from the lower portion 12. This may be of particular importance given that in order to provide a fluid tight seal between the upper and lower portions 11, 12, the upper portion 11 must be tightly and firmly screwed into the lower portion 12.

Figure 3:
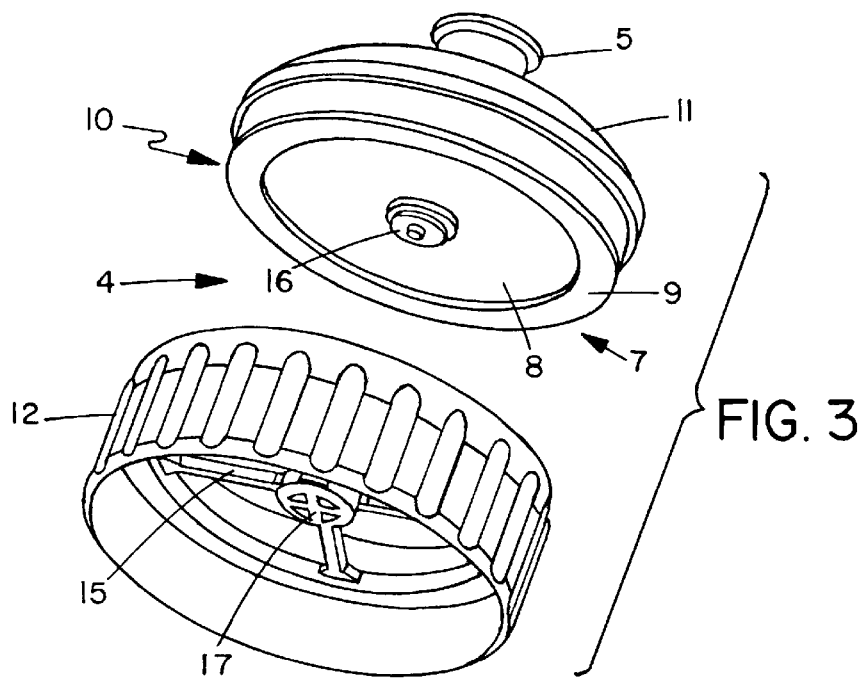
FIG. 3 is an exploded perspective view of the upper and lower portions of the filter housing illustrated in FIGS. 1 and 2.
Figure 4:
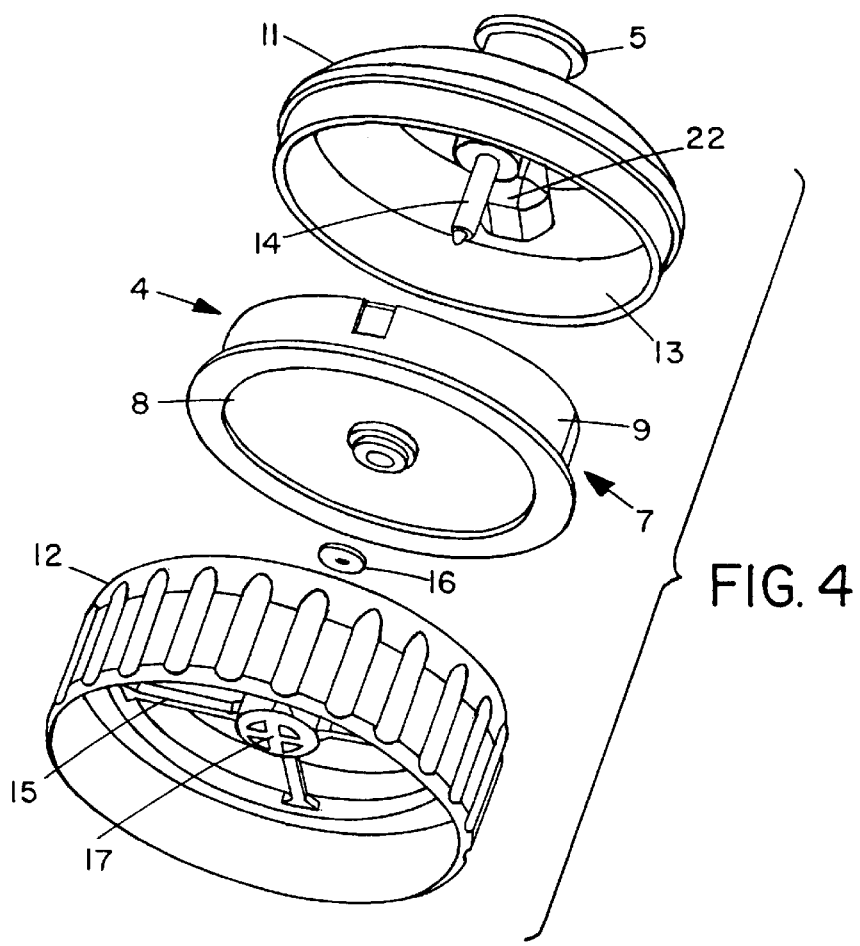
FIG. 4 is a further exploded view of the embodiment illustrated in FIG. 3.

FIGS. 3 and 4 illustrate how the filtering means 4 may be removed and replaced. Firstly, and with respect of FIG. 3, the filter housing 10 (comprising the upper and lower portions 11, 12 and the filtering means 4) is unscrewed from the fluid storage portion 2. The upper and lower portions 11, 12 are then unscrewed from each other as described previously with respect to FIG. 5. This provides the two portions 11. 12 as illustrated in FIG. 3. With respect to FIG. 4, the cartridge 7 may be removed from the upper portion 11 once the rubber washer 16 has been removed from the end of the rod-like portion 14. The cartridge 7 may then be discarded if it has been fully used up. The filter paper 6 may then be removed from the cross piece 15 of the lower portion 12 and similarly discarded, if required. A replacement filter paper 6 may then be placed on the cross piece 15 and a replacement cartridge 7 be placed within the recess 13 in the upper portion 11. The rubber washer 16 may then be placed over the end of the rod-like portion 14 and the upper and lower portions 11, 12 re-attached. The engagement means 22, 24 as described previously may be utilised to assist in screwing the upper portion 11 firmly into the lower portion 12.

The fluid storage portion 2 is provided with storage means in the form of a recess 27 formed in the bottom of the fluid storage portion 2. The recess 27 may be utilised to store any items as required or as desired. For example, the recess 27 may be utilised to store keys, spare filter papers, iodine tablets, money and the like.

Figure 6:
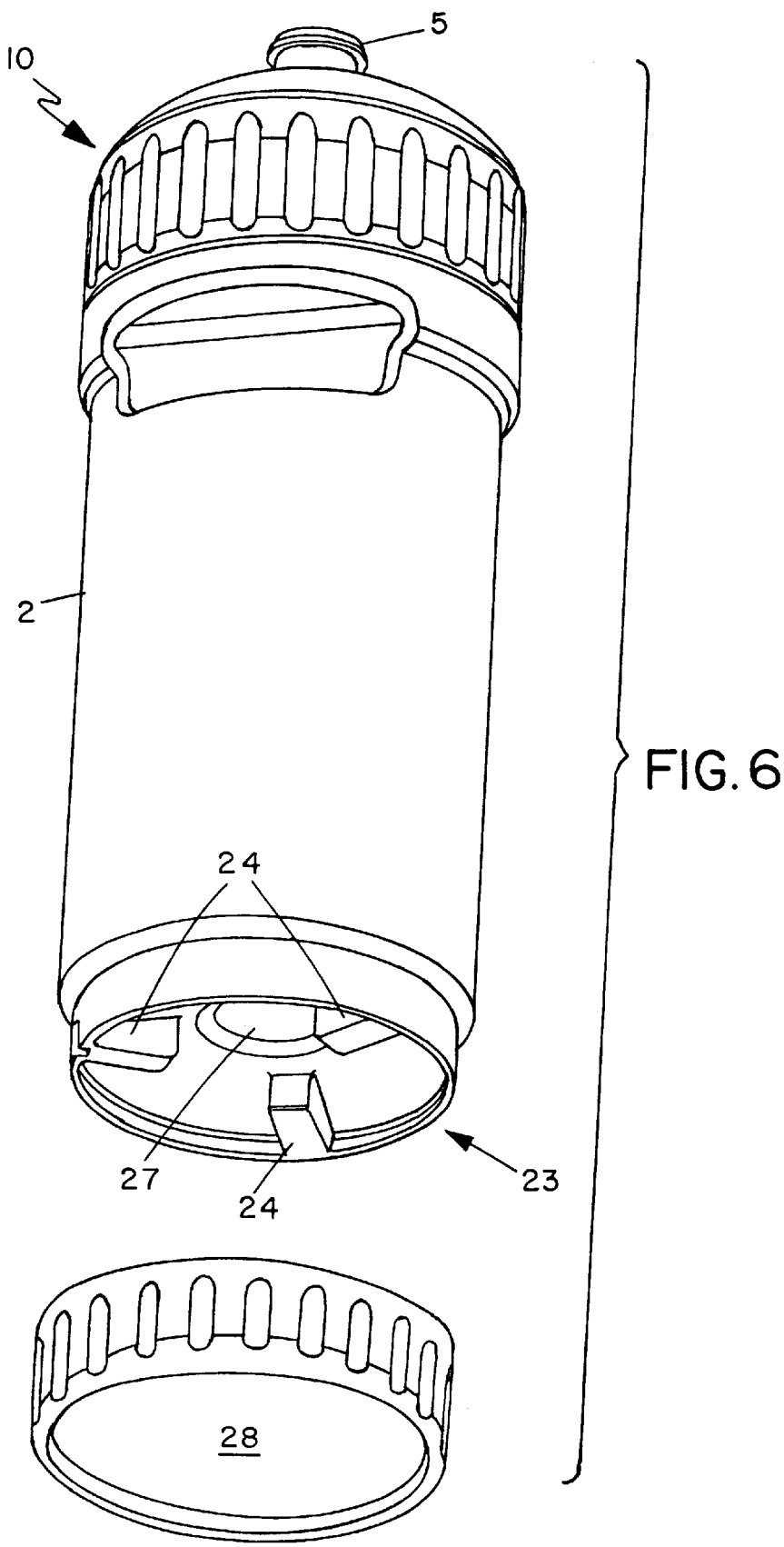
FIG. 6 is an alternative embodiment of the present invention illustrating storage means associated with the apparatus.

The alternative embodiment of the invention illustrated in FIG. 6 is the same as the embodiments illustrated in FIGS. 1 to 5, except that the bottom 23 of the fluid storage portion 2 is provided with a resealable cover in the form of a screw-on lid portion 28. The lid 28 provides a resealable cover for the storage means in the form of the recess 27.

Aspects of the present invention have been described by way of example only and it should be appreciated that modifications and additions may be made thereto without departing from the scope thereof as defined in the appended claims.

The claims defining the invention are:

1. A fluid dispensing apparatus, comprising:
   (a) a cylindrical fluid storage portion with substantially flexible sides having a first diameter, the flexible sides being configured to yield to squeezing, and return to the original shape once squeezing has ceased,
   (b) a filter housing which includes an upper portion and a lower portion, the lower portion having a screw fit at one end with the fluid storage portion, and at its opposite end having a screw fit with the upper portion, the lower portion comprising an annular ring having a diameter substantially equal to the first diameter of said fluid dispensing portion, the upper portion being substantially dome-shaped and including a closeable fluid outlet at one end, the upper portion including an engagement means for aiding in the removal of the upper portion from the lower portion;
   (c) a filter cartridge containing a filter material disposed and retained between the upper portion and the lower portion of the filter housing; the filter housing being removable from the fluid storage portion as a complete unit by unscrewing the lower portion only; and
   the fluid dispensing apparatus configured to allow passage of fluid from the fluid storage portion, through the filter cartridge, and out the fluid outlet.

2. Fluid dispensing apparatus as claimed in claim 1, wherein said fluid storage portion is comprised primarily of a plastics material.

3. Fluid dispensing apparatus as claimed in claim 1, wherein said filter housing includes filter retention means for releasably retaining said filter cartridge within said housing.

4. Fluid dispensing apparatus as claimed in claim 1, wherein said filter housing further includes sealing means whereby fluid from said fluid storage portion is prevented from reaching said fluid exit portion other than by passing through said filter cartridge.

5. Fluid dispensing apparatus as claimed in claim 1, wherein said filter cartridge further includes sealing means whereby fluid from said fluid storage portion is prevented from reaching said fluid exit portion other than by passing through said filtering means.

6. Fluid dispensing apparatus as claimed in claim 1, wherein said filter cartridge comprises a cartridge of granular activated carbon.

7. Fluid dispensing apparatus as claimed in claim 1, wherein said filter cartridge comprises a plurality of filters.

8. Fluid dispensing apparatus as claimed in claim 1, wherein said filter cartridge comprises a pre-filter portion and a main filter portion.

9. Fluid dispensing apparatus as claimed in claim 8, wherein said pre-filter portion is in the form of filter paper, and said main filter portion is in the form of a cartridge of granular activated carbon.

10. A fluid dispensing apparatus, comprising:
    (a) a cylindrical fluid storage portion with substantially flexible sides, that are configured to yield to squeezing, and return to the original shape once squeezing has ceased,
    (b) a filter housing which includes an upper portion and a lower portion, the lower portion having a screw fit at one end with the fluid storage portion, and at its opposite end having a screw fit with the upper portion, the upper portion including a closeable fluid outlet;
    (c) a filter cartridge containing a filter material disposed and retained between the upper portion and the lower portion of the filter housing; the filter housing being removable from the fluid storage portion as a complete unit;
    (d) said fluid storage portion and upper portion being provided with complimentary engagement means, the arrangement and construction being such that once the lower portion has been unscrewed from the fluid storage portion, the engagement means of the upper portion may be engaged with the complimentary engagement means disposed on the fluid storage portion to assist in the screwing or unscrewing of said upper portion with respect to said lower portion; and
    the fluid dispensing apparatus configured to allow passage of fluid from the fluid storage portion, through the filter cartridge, and out the fluid outlet.

11. Fluid dispensing apparatus as claimed in claim 1, wherein said fluid storage portion is further provided with additional storage means.

12. A fluid dispensing apparatus, comprising:
    (a) a cylindrical fluid storage portion with substantially flexible sides, that are configured to yield to squeezing, and return to the original shape once squeezing has ceased,
    (b) a filter housing which includes an upper portion and a lower portion, the lower portion having a screw fit at one end with the fluid storage portion, and at its opposite end having a screw fit with the upper portion, the upper portion including a closeable fluid outlet;
    (c) a filter cartridge containing a filter material disposed and retained between the upper portion and the lower portion of the filter housing; the filter housing being removable from the fluid storage portion as a complete unit;
    (d) said fluid storage portion being provided with additional storage means; and
    (e) said additional storage means being in the form of a recess formed within an end of the fluid storage portion which does not engage with the filter cartridge.

13. Fluid dispensing apparatus as claimed in claim 12, wherein said storage means is provided with a releasable cover.

14. Fluid dispensing apparatus as claimed in claim 13, wherein said releasable cover is in the form of a screw-on lid portion.

15. Fluid dispensing apparatus as claimed in claim 1, wherein said fluid dispensing apparatus is in the form of a portable bottle.

16. Fluid dispensing apparatus as claimed in claim 1, wherein said fluid is water.

17. Fluid dispensing apparatus as claimed in claim 1, wherein said fluid is a gas.

18. A method of filtering a fluid utilizing the fluid dispensing apparatus as claimed in claim 1, said method comprising the steps of:

(a) filling the fluid storage portion with a fluid;

(b) squeezing and/or inverting the fluid storage portion whereby the fluid stored within the fluid storage portion is forced to pass through the filter cartridge and out through the fluid outlet in the upper portion;

(c) at periodic intervals after a plurality of uses of the fluid dispensing apparatus, removing the filter housing as a unit from the fluid storage portion by unscrewing the lower portion only from the fluid storage portion;

(d) after removing the filter housing from the fluid storage portion, unscrewing the upper portion from the lower portion using the engagement means on the upper portion to aid in the unscrewing; and (e) after removing the upper portion from the lower portion of the filter housing, removing the filter cartridge and replacing it with a new filter cartridge, then attaching the upper portion to the lower portion, and attaching the filter housing back onto the fluid storage portion by screwing the lower portion onto the fluid storage portion.

19. A method as claimed in claim 18, wherein said fluid consists primarily of water.

\* \* \* \* \*